United States Patent
Wu et al.

(10) Patent No.: US 11,299,629 B2
(45) Date of Patent: Apr. 12, 2022

(54) SILANE-MODIFIED POLYPHENYLENE ETHER RESIN AND PREPARATION METHOD THEREOF

(71) Applicant: Prior Company Limited, Taipei (TW)

(72) Inventors: Hong-Hsin Wu, Taipei (TW);
Po-Cheng Chang, Taipei (TW);
Ying-Chen Chen, Taipei (TW);
Cheng-Hsin Tsai, Taipei (TW)

(73) Assignee: Prior Company Limited, Taipei (TW)

( * ) Notice: Subject to any disclaimer, the term of this patent is extended or adjusted under 35 U.S.C. 154(b) by 0 days.

(21) Appl. No.: 16/997,905

(22) Filed: Aug. 19, 2020

(65) Prior Publication Data

US 2021/0054207 A1 Feb. 25, 2021

Related U.S. Application Data

(60) Provisional application No. 62/889,578, filed on Aug. 21, 2019.

(30) Foreign Application Priority Data

Jul. 24, 2020 (TW) ................. 109125181

(51) Int. Cl.
*C08G 77/46* (2006.01)
*C08L 83/12* (2006.01)
*C08G 65/48* (2006.01)
*C08G 77/442* (2006.01)

(52) U.S. Cl.
CPC ............ *C08L 83/12* (2013.01); *C08G 65/485* (2013.01); *C08G 77/442* (2013.01); *C08G 77/46* (2013.01); *C08G 2650/20* (2013.01); *C08G 2650/36* (2013.01)

(58) Field of Classification Search
CPC ........ C08G 65/485; C08G 77/46; C08L 83/12
See application file for complete search history.

(56) References Cited

U.S. PATENT DOCUMENTS

2020/0002473 A1* 1/2020 Yuan ...................... B32B 27/04

FOREIGN PATENT DOCUMENTS

| CN | 106916293 | | 7/2017 |
|----|-----------|---|--------|
| CN | 109988299 | | 7/2019 |
| CN | 110423342 | * | 11/2019 |
| EP | 879843 | * | 11/1998 |

OTHER PUBLICATIONS

English langauge translation CN 110423342, Nov. 2019.*
Drawings/Images from CN 110423342, Nov. 2019.*
"Office Action of Taiwan Counterpart Application", dated Feb. 3, 2021, p. 1-p. 5.
"Office Action of Taiwan Counterpart Application", dated Oct. 15, 2021, p. 1-p. 5.

* cited by examiner

*Primary Examiner* — Margaret G Moore
(74) *Attorney, Agent, or Firm* — JCIPRNET

(57) ABSTRACT

A silane-modified polyphenylene ether resin and a preparation method thereof are provided. A polyphenylene ether resin having hydroxyl groups at both ends is reacted with a silane having at least one alkoxy group and at least one vinyl group at the end, so as to obtain the silane-modified polyphenylene ether resin with a vinyl group at the end.

4 Claims, 2 Drawing Sheets

SILANE-MODIFIED POLYPHENYLENE ETHER RESIN AND PREPARATION METHOD THEREOF

CROSS-REFERENCE TO RELATED APPLICATION

This application claims the priority benefit of U.S. provisional application Ser. No. 62/889,578, filed on Aug. 21, 2019, and Taiwan application serial no. 109125181, filed on Jul. 24, 2020. The entirety of each of the above-mentioned patent applications is hereby incorporated by reference herein and made a part of this specification.

BACKGROUND

Technical Field

The disclosure relates to a modified polyphenylene ether resin and a preparation method thereof, and particularly relates to a silane-modified polyphenylene ether resin and a preparation method thereof.

Description of Related Art

As the semiconductor technology continued to advance in recent years, the sizes of electronic components are being reduced, the line width of metal wires in circuit boards is decreasing, and the line spacing between wires is becoming smaller and smaller. As a consequence, signal interference becomes more likely to occur between metal wires, and the metal wires and the dielectric layer are likely to cause delay in signal transmission as well. Therefore, the electrical properties of the dielectric layer play an important role in circuit boards. Smaller dielectric constant (Dk) and dielectric loss (Df) of the dielectric layer help to reduce signal loss and improve transmission speed of the printed circuit board material.

The conventional low-Dk/Df materials commonly used in high-frequency and high-speed printed circuit boards include polyphenylene ether. Since polyphenylene ether has a higher glass transition temperature, lower Dk/Df, and lower water absorption, it has drawn a lot of attention in the field of high-frequency and high-speed electronics. The commercially available polyphenylene ether includes hydroxyl-terminated resin. However, hydroxyl has low reactivity and few reactive groups, so it cannot form a cured system with high crosslink density, which greatly affects the thermal stability, mechanical properties, and adhesion properties. In addition, since hydroxyl has large polarity and is easy to absorb water, the Dk/Df of hydroxyl-terminated polyphenylene ether resin may be too large to meet the requirements. For the above reason, there is a demand for modifying polyphenylene ether resin to obtain better properties.

SUMMARY

The disclosure provides a silane-modified polyphenylene ether resin and a preparation method thereof for obtaining a silane-modified polyphenylene ether resin having reactive vinyl groups at both ends to obtain better properties.

The disclosure provides a silane-modified polyphenylene ether resin having a structure represented by formula (1):

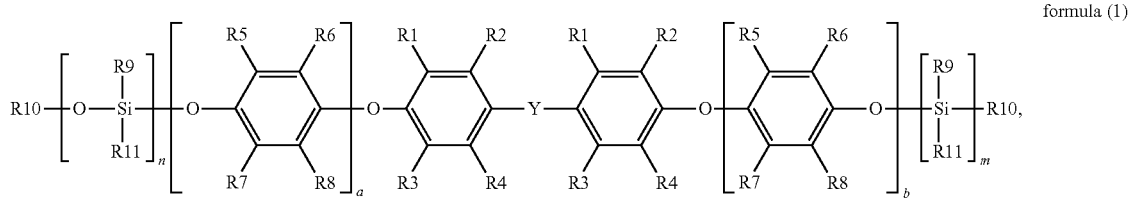

formula (1)

in formula (1), R1, R2, R3 and R4 are each independently hydrogen, a linear or branched C1 to C6 alkyl group, R5, R6, R7 and R8 are each independently hydrogen, a linear or branched C1 to C6 alkyl group, R9 is a linear or branched C1 to C6 alkyl group or aryl group, R10 is hydrogen or a C1 to C6 alkyl group, R11 is a functional group with a crosslinkable double bond, Y is a linear, branched or cyclic C1 to C10 alkyl group, a and b are each independently an integer from 0 to 50, and n and m are each independently an integer from 1 to 4.

In an embodiment of the disclosure, the functional group with the crosslinkable double bond includes an allyl group, a vinyl group, an acrylate group or a methacrylate group.

In an embodiment of the disclosure, the functional group with the crosslinkable double bond includes a C1 to C4 alkylacrylate group, a C1 to C4 alkyl vinyl group or a C1 to C3 methacryloxyalkyl group.

The disclosure provides a silane-modified polyphenylene ether resin having a structure represented by formula (2):

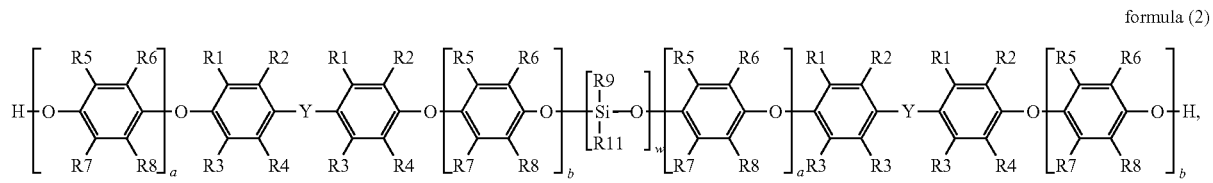

formula (2)

in formula (2), R1, R2, R3 and R4 are each independently hydrogen, a linear or branched C1 to C6 alkyl group, R5, R6, R7 and R8 are each independently hydrogen, a linear or branched C1 to C6 alkyl group, R9 is a linear or branched C1 to C6 alkyl group or aryl group, R11 is a functional group with a crosslinkable double bond, Y is a linear, branched or cyclic C1 to C10 alkyl group, a and b are each independently an integer from 0 to 50, and W is an integer from 1 to 4.

In an embodiment of the disclosure, the functional group with the crosslinkable double bond includes an allyl group, a vinyl group, an acrylate group or a methacrylate group.

In an embodiment of the disclosure, the functional group with the crosslinkable double bond includes a C1 to C4 alkylacrylate group, a C1 to C4 alkyl vinyl group or a C1 to C3 methacryloxyalkyl group.

The disclosure provides a preparation method of silane-modified polyphenylene ether resin for preparing the silane-modified polyphenylene ether resin described above, a synthesis reaction formula of which is represented by reaction formula (1):

Based on the above, the disclosure utilizes a polyphenylene ether resin with hydroxyl groups at both ends to react with a silane with at least one alkoxy group and at least one vinyl group at the end, so as to obtain a silane-modified polyphenylene ether resin with a reactive vinyl group at the end. The obtained silane-modified polyphenylene ether resin has the excellent dielectric properties, heat resistance, dimensional stability, low water absorption and low limit expansion coefficient of polyphenylene ether. Moreover, the introduction of low-polarity silane improves the fluidity and thermal stability of the polyphenylene ether resin. What is more, crosslinking reaction is carried out with the structure of vinyl under the peroxide effect to improve the overall crosslink density, form a cured resin with high crosslink density, and increase the glass transition temperature (Tg).

BRIEF DESCRIPTION OF THE DRAWINGS

The accompanying drawings are included to provide a further understanding of the disclosure, and are incorporated reaction formula (1)

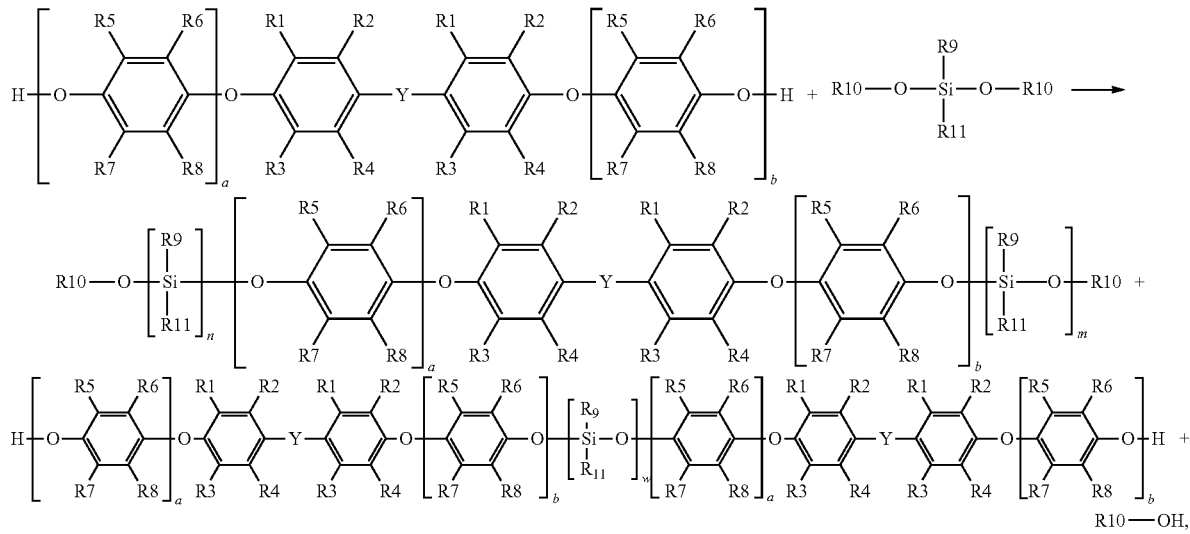

in reaction formula (1), R1, R2, R3 and R4 are each independently hydrogen, a linear or branched C1 to C6 alkyl group, R5, R6, R7 and R8 are each independently hydrogen, a linear or branched C1 to C6 alkyl group, R9 is a linear or branched C1 to C6 alkyl group or aryl group, R10 is hydrogen or a C1 to C6 alkyl group, R11 is a functional group with a crosslinkable double bond, Y is a linear, branched or cyclic C1 to C10 alkyl group, W is an integer from 1 to 4, a and b are each independently an integer from 0 to 50, and n and m are each independently an integer from 1 to 4.

In an embodiment of the disclosure, the functional group with the crosslinkable double bond includes an allyl group, a vinyl group, an acrylate group or a methacrylate group.

In an embodiment of the disclosure, the functional group with the crosslinkable double bond includes a C1 to C4 alkylacrylate group, a C1 to C4 alkyl vinyl group or a C1 to C3 methacryloxyalkyl group.

In an embodiment of the disclosure, a reaction temperature of reaction formula (1) is 100° C. to 160° C., and a reaction time is 6 hours to 20 hours.

in and constitute a part of this specification. The drawings illustrate exemplary embodiments of the disclosure and, together with the description, serve to explain the principles of the disclosure.

Figure 1:
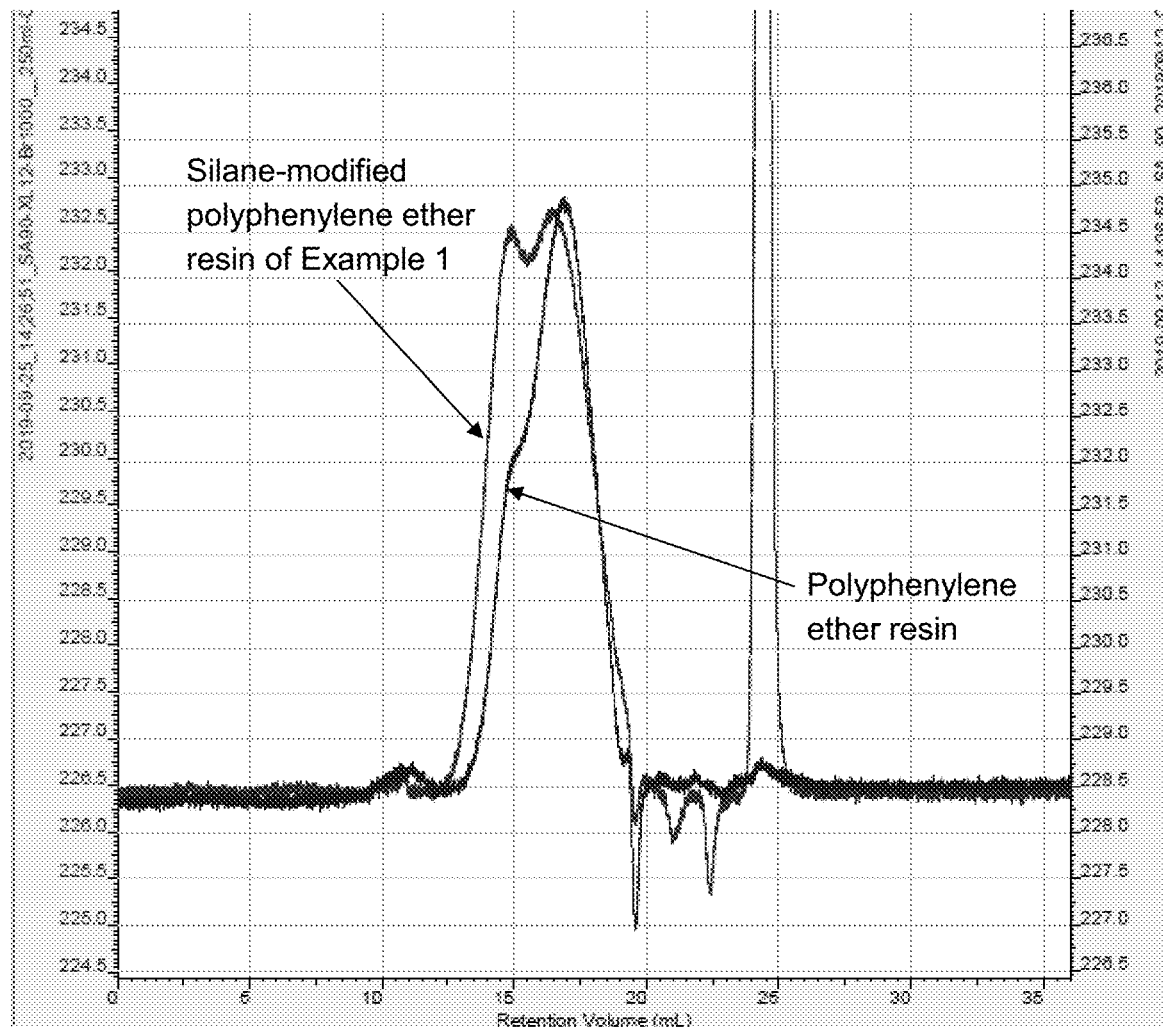

FIG. 1 is a GPC (gel permeation chromatography) diagram showing comparison between the silane-modified polyphenylene ether resin of Example 1 and polyphenylene ether resin.

Figure 2:
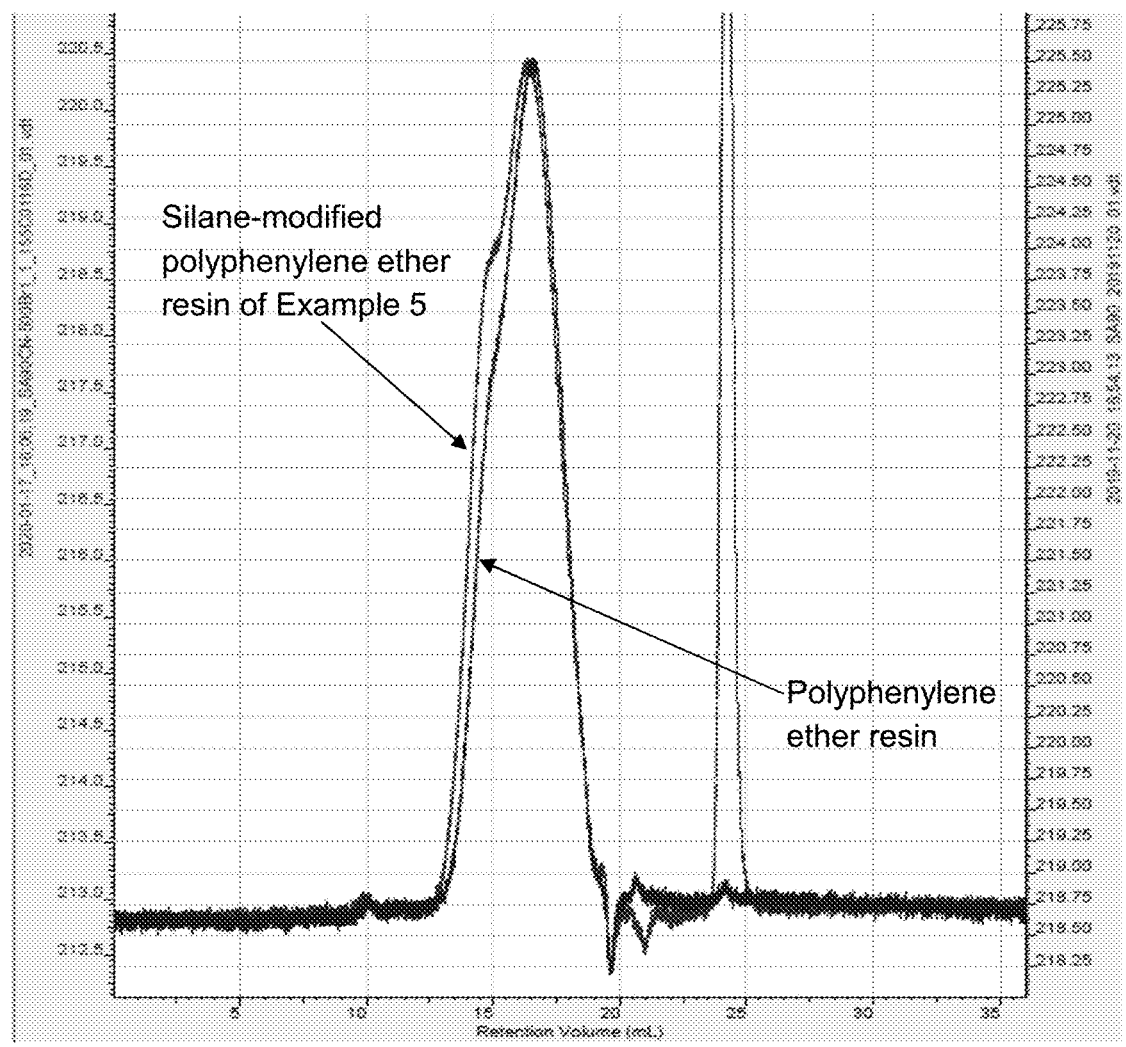

FIG. 2 is a GPC diagram showing comparison between the silane-modified polyphenylene ether resin of Example 5 and polyphenylene ether resin.

DETAILED DESCRIPTION OF DISCLOSED EMBODIMENTS

Hereinafter, embodiments of the disclosure will be described in detail. Nevertheless, these embodiments are illustrative, and the disclosure is not limited thereto.

In this specification, a range represented by "from a value to another value" is a general expression to avoid listing all the values in the range one by one in the specification.

Therefore, the recitation of a specific numerical range covers any numerical value within the numerical range and a smaller numerical range defined by any numerical values within the numerical range, as if the any numerical value and the smaller numerical range are written in the description in the specification.

The disclosure provides a silane-modified polyphenylene ether resin having a structure represented by formula (1):

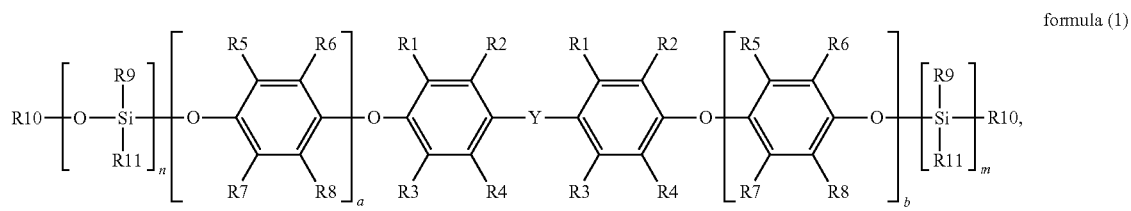

formula (1)

wherein in formula (1), R1, R2, R3 and R4 are each independently hydrogen, a linear or branched C1 to C6 alkyl group, R5, R6, R7 and R8 are each independently hydrogen, a linear or branched C1 to C6 alkyl group, R9 is a linear or branched C1 to C6 alkyl group or aryl group, R10 is hydrogen or a C1 to C6 alkyl group, R11 is a functional group with a crosslinkable double bond, Y is a linear, branched or cyclic C1 to C10 alkyl group, a and b are each independently an integer from 0 to 50, and n and m are each independently an integer from 1 to 4.

More specifically, in formula (1), R11 is a functional group with a crosslinkable double bond, and the functional group with a crosslinkable double bond may include an allyl group, a vinyl group, an acrylate group or a methacrylate group, or the functional group with a crosslinkable double bond may also include a C1 to C4 alkylacrylate group, a C1 to C4 alkyl vinyl group or a C1 to C3 methacryloxyalkyl group, but the disclosure is not limited thereto.

In addition to the above silane-modified polyphenylene ether resin represented by formula (1), the disclosure provides another silane-modified polyphenylene ether resin having a structure represented by formula (2):

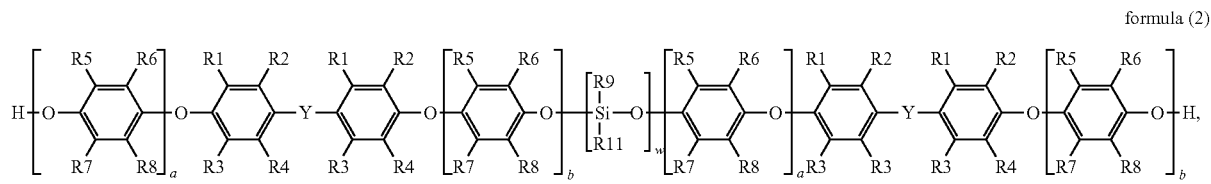

formula (2)

wherein in formula (2), R1, R2, R3 and R4 are each independently hydrogen, a linear or branched C1 to C6 alkyl group, R5, R6, R7 and R8 are each independently hydrogen, a linear or branched C1 to C6 alkyl group, R9 is a linear or branched C1 to C6 alkyl group or aryl group, R11 is a functional group with a crosslinkable double bond, Y is a linear, branched or cyclic C1 to C10 alkyl group, a and b are each independently an integer from 0 to 50, and W is an integer from 1 to 4.

More specifically, in formula (2), R11 is a functional group with a crosslinkable double bond, and the functional group with a crosslinkable double bond may include an allyl group, a vinyl group, an acrylate group or a methacrylate group, or the functional group with a crosslinkable double bond may also include a C1 to C4 alkylacrylate group, a C1 to C4 alkyl vinyl group or a C1 to C3 methacryloxyalkyl group, but the disclosure is not limited thereto.

In addition, the disclosure also provides a preparation method of silane-modified polyphenylene ether resin, which is used to prepare the above-mentioned silane-modified polyphenylene ether resins represented by formula (1) and formula (2). The synthesis reaction formula thereof is represented by reaction formula (1):

reaction formula (1)

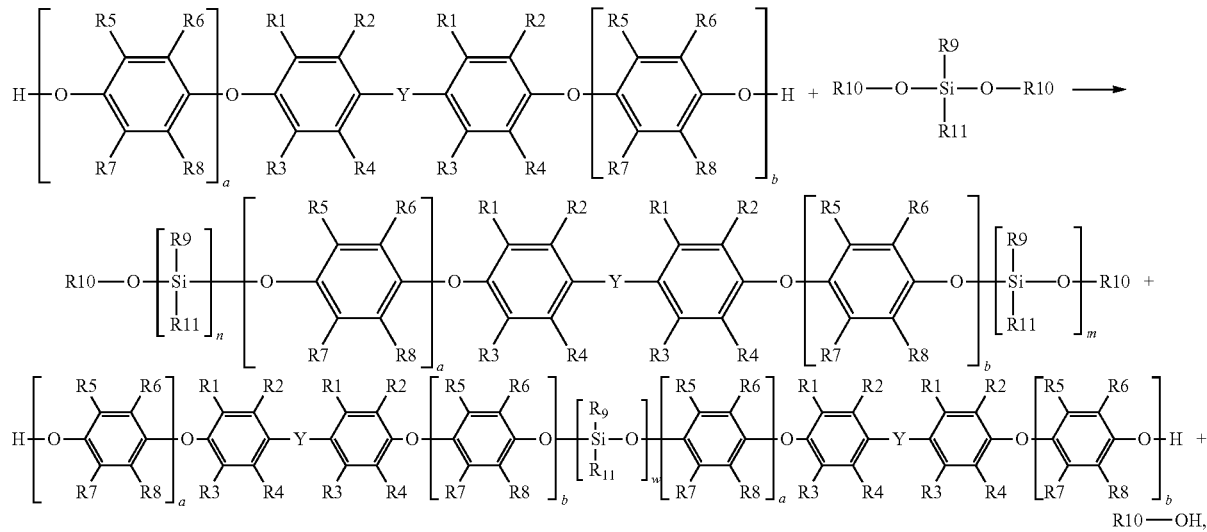

wherein in reaction formula (1), R1, R2, R3 and R4 are each independently hydrogen, a linear or branched C1 to C6 alkyl group, R5, R6, R7 and R8 are each independently hydrogen, a linear or branched C1 to C6 alkyl group, R9 is a linear or branched C1 to C6 alkyl group or aryl group, R10 is hydrogen or a C1 to C6 alkyl group, R11 is a functional group with a crosslinkable double bond, Y is a linear, branched or cyclic C1 to C10 alkyl group, W is an integer from 1 to 4, a and b are each independently an integer from 0 to 50, and n and m are each independently an integer from 1 to 4.

More specifically, in reaction formula (1), R11 is a functional group with a crosslinkable double bond, and the functional group with a crosslinkable double bond may include an allyl group, a vinyl group, an acrylate group or a methacrylate group, or the functional group with a crosslinkable double bond may also include a C1 to C4 alkylacrylate group, a C1 to C4 alkyl vinyl group or a C1 to C3 methacryloxyalkyl group, but the disclosure is not limited thereto.

As shown in the above reaction formula (1), the disclosure mainly utilizes a polyphenylene ether resin with hydroxyl groups at both ends to react with a silane with at least one alkoxy group and at least one vinyl group at the end, and under reaction with a catalyst, obtains a silane-modified polyphenylene ether resin with a vinyl group at the end (that is, the silane-modified polyphenylene ether resins represented by formula (1) and formula (2)). The reaction temperature of reaction formula (1) is, for example, 100° C. to 160° C., preferably, for example, 130° C. to 150° C., and the reaction time is, for example, 6 hours to 20 hours, preferably, for example, 10 hours to 20 hours. The reaction of reaction formula (1) is carried out in a nitrogen environment. In the present embodiment, based on the alkoxy molar ratio of the hydroxyl groups of the polyphenylene ether resin and the vinyl-containing dialkoxysilane, the ratio of the polyphenylene ether resin to the vinyl-containing dialkoxysilane is, for example, 1:0.5 to 1:4.0.

In the present embodiment, the amount of the catalyst used is, for example, 300 ppm to 3000 ppm based on the weight of the polyphenylene ether resin. The catalyst may include, but not limited to, an acid catalyst, a base catalyst, a metal compound catalyst, an ester catalyst or combinations thereof, preferably, for example, ethyl triphenyl phosphine chloride (ETPPCl), ethyltriphenylphosphonium bromide (ETPPBr), ethyl triphenyl phosphine iodide (ETPPI), ethyl triphenyl phosphine acetate (ETPPAAc), tetrabutylammonium bromide (TBAB), triphenyl phosphine (TPP) or tetra-n-butyl ammonium acetate (TBAAc), but the disclosure is not limited thereto.

In reaction formula (1), the vinyl-containing alkoxysilane used in the disclosure is represented by formula (A):

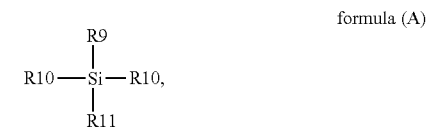

formula (A)

wherein as mentioned above, in formula (A), R9 is a linear or branched C1 to C6 alkyl group or aryl group, R10 is hydrogen or a C1 to C6 alkyl group, R11 is a functional group with a crosslinkable double bond, and the functional group with a crosslinkable double bond may include an allyl group, a vinyl group, an acrylate group or a methacrylate group, or the functional group with a crosslinkable double bond may also include a C1 to C4 alkylacrylate group, a C1 to C4 alkyl vinyl group or a C1 to C3 methacryloxyalkyl group, but the disclosure is not limited thereto. In the present embodiment, specific examples of formula (A) may include methyl vinyl dimethoxy silane, methyl vinyl diethoxy silane, 1-(methacryloxymethyl)methyldimethoxysilane, 3-(methacryloxypropyl)methyldimethoxysilane, 3-(methacryloxypropyl)methyldiethoxysilane, allylmethyldimethoxysilane, 1-allyl-2,2-dimethoxy-1,2-azasilylcyclopentane or combinations thereof, but the disclosure is not limited thereto. The chemical structures of the specific cases are as follows:

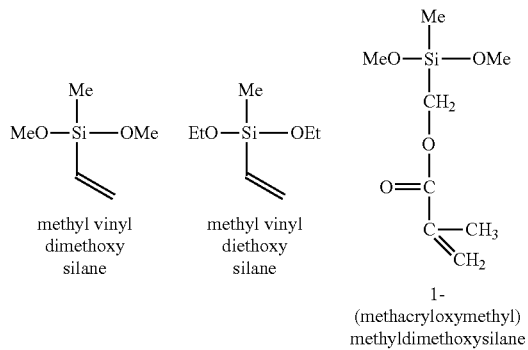

methyl vinyl dimethoxy silane methyl vinyl diethoxy silane 1-(methacryloxymethyl)methyldimethoxysilane

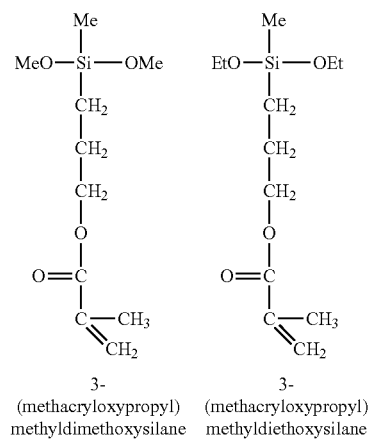

3-(methacryloxypropyl)methyldimethoxysilane 3-(methacryloxypropyl)methyldiethoxysilane

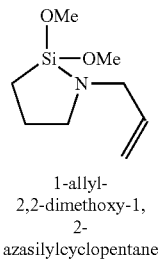

1-allyl-2,2-dimethoxy-1,2-azasilylcyclopentane

In the present embodiment, formula (A) may be represented by the following formula (A-1):

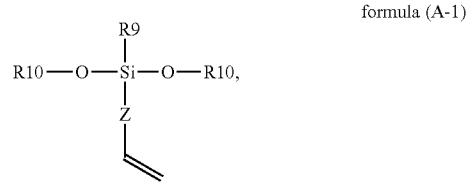

formula (A-1)

wherein in formula (A-1), Z is a C1 to C4 alkylene group.

Formula (A) may also be represented by the following formula (A-2):

formula (A-2)

wherein in formula (A-2), P is a C1 to C3 alkylene group.

Hereinafter, the silane-modified polyphenylene ether resin provided according to the disclosure will be described in detail through experimental examples. Nevertheless, the following experimental examples are not intended to limit the disclosure.

EXPERIMENTAL EXAMPLE

In order to prove that the silane-modified polyphenylene ether resin can be obtained by the preparation method of the disclosure, the following experimental examples have been carried out.

In the experimental examples, for example, NORYL SA90 produced by SABIC was used as the polyphenylene ether resin, and it was found through GPC data analysis (using dimethyl acetamide (DMAc) as mobile phase and polystyrene as standard product) that the number average molecular weight (Mn) and weight average molecular weight (Mw) of SA90 were 1912 g/mol and 2999 g/mol, respectively. However, the disclosure is not limited thereto. Besides NORYL SA90 produced by SABIC, other polyphenylene ether resins with hydroxyl groups at the ends may also be used.

Example 1

60.0 g of polyphenylene ether resin (SA90, SABIC) and 60.0 g of xylene were put into a 250 mL three-necked flask with stirring, thermocouple, reflux condenser, and oil-water separator, and dissolved and stirred evenly at a temperature of 80° C. 16.997 g of methyl vinyl dimethoxy silane (XL12, Wacker Germany) was added and stirred evenly and then 0.06 g of ethyltriphenylphosphonium bromide (ETPPBr) was added, and the internal temperature was raised to 145° C. to wait for the solution to reflux in the three-necked flask and time the reaction for 13 hours. The temperature was lowered to 80° C. and the material was collected to obtain a vinyl-containing silane-modified polyphenylene ether resin A1. The resin A1 was sampled for GPC test (using dimethyl acetamide (DMAc) as mobile phase and polystyrene as standard product) to obtain the number average molecular weight (Mn)/weight average molecular weight (Mw): 2251/4479. FIG. 1 is a GPC (gel permeation chromatography) diagram showing comparison between the silane-modified polyphenylene ether resin of Example 1 and polyphenylene ether resin.

Example 2

60.0 g of polyphenylene ether resin (SA90, SABIC) and 40.0 g of xylene were put into a three-necked flask, and dissolved and stirred evenly at a temperature of 80° C. 11.80 g of methyl vinyl dimethoxy silane (XL12, Wacker Germany) was added and stirred evenly and the internal temperature was raised to 100° C., and then 0.06 g of ethyltriphenylphosphonium bromide (ETPPBr) was added and the internal temperature was raised to 145° C. to wait for the solution to reflux in the three-necked flask and time the reaction for 10 hours. The temperature was lowered to 80° C. and the material was collected to obtain a vinyl-containing silane-modified polyphenylene ether resin A2. The resin A2 was sampled for GPC test to obtain Mn/Mw: 2116/3915.

Example 3

60.0 g of polyphenylene ether resin (SA90, SABIC) and 60.0 g of xylene were put into a three-necked flask, and dissolved and stirred evenly at a temperature of 80° C. 16.99 g of methyl vinyl dimethoxy silane (XL12, Wacker Germany) was added and stirred evenly and the internal temperature was raised to 100° C., and then 0.06 g of tetrabutylammonium bromide (TBAB) was added and the internal temperature was raised to 135° C. to wait for the solution to reflux in the three-necked flask and time the reaction for 10 hours. The temperature was lowered to 80° C. and the material was collected to obtain a vinyl-containing silane-modified polyphenylene ether resin A3. The resin A3 was sampled for GPC test to obtain Mn/Mw: 2027/3369.

Example 4

60.0 g of polyphenylene ether resin (SA90, SABIC) and 60.0 g of xylene were put into a three-necked flask, and dissolved and stirred evenly at a temperature of 80° C. 16.99 g of methyl vinyl dimethoxy silane (XL12, Wacker Germany) was added and stirred evenly and the internal temperature was raised to 100° C., and then 0.06 g of triphenyl phosphine (TPP) was added and the internal temperature was raised to 145° C. to wait for the solution to reflux in the three-necked flask and time the reaction for 10 hours. The temperature was lowered to 80° C. and the material was collected to obtain a vinyl-containing silane-modified polyphenylene ether resin A4. The resin A4 was sampled for GPC test to obtain Mn/Mw: 2120/3686.

Example 5

84.0 g of polyphenylene ether resin (SA90, SABIC) and 45.23 g of xylene were put into a three-necked flask, and dissolved and stirred evenly at a temperature of 80° C. 6.608 g of methyl vinyl dimethoxy silane (XL12, Wacker Germany) was added and stirred evenly and the internal temperature was raised to 100° C., and then 0.042 g of ethyltriphenylphosphonium bromide (ETPPBr) was added and the internal temperature was raised to 155° C. to wait for the solution to reflux in the three-necked flask and time the reaction for 13 hours. The temperature was lowered to 80° C. and the material was collected to obtain a vinyl-containing silane-modified polyphenylene ether resin A5. The resin A5 was sampled for GPC test to obtain Mn/Mw: 2295/4050. FIG. 2 is a GPC diagram showing comparison between the silane-modified polyphenylene ether resin of Example 5 and polyphenylene ether resin.

Example 6

60.0 g of polyphenylene ether resin (SA90, SABIC) and 60.0 g of xylene were put into a three-necked flask, and dissolved and stirred evenly at a temperature of 80° C. 16.99 g of methyl vinyl dimethoxy silane (XL12, Wacker Germany) was added and stirred evenly and the internal temperature was raised to 100° C., and then 0.18 g of tetrabutylammonium bromide (TBAB) was added and the internal temperature was raised to 130° C. to wait for the solution to reflux in the three-necked flask and time the reaction for 15 hours. The temperature was lowered to 80° C. and the material was collected to obtain a vinyl-containing silane-modified polyphenylene ether resin A6. The resin A6 was sampled for GPC test to obtain Mn/Mw: 2137/3606.

The ratios of Examples 1 to 6 and the GPC test results of the material SA90 are summarized in Table 1 below:

|  | Example 1 | Example 2 | Example 3 | Example 4 | Example 5 | Example 6 | SA90 |
| --- | --- | --- | --- | --- | --- | --- | --- |
| Hydroxyl:Alkoxy | 1:3.6 | 1:2.5 | 1:3.6 | 1:3.6 | 1:1 | 1:3.6 |  |
| ETPPBr (ppm) | 1000 | 1000 | — | — | 500 | — |  |
| TBAB (ppm) | — | — | 1000 | — | — | 3000 |  |
| TPP (ppm) | — | — | — | 1000 | — | — |  |
| Reaction temperature (° C.) | 145 | 145 | 135 | 145 | 155 | 130 |  |
| Reaction time (Hr) | 13 | 10 | 10 | 10 | 13 | 15 |  |
| Mn | 2251 | 2116 | 2027 | 2120 | 2295 | 2137 | 1912 |
| Mw | 4479 | 3915 | 3369 | 3686 | 4050 | 3606 | 2999 |
| PDI(Mw/Mn) | 1.989 | 1.85 | 1.662 | 1.739 | 1.765 | 1.687 | 1.569 |

In summary, the disclosure overcomes the defects of hydroxyl-terminated polyphenylene ether compounds to solve the problem that a cured system with high crosslink density cannot be formed due to the high melting point and poor processing properties of polyphenylene ether compounds and the low reactivity of the hydroxyl groups at the end, and improve the mechanical properties, thermal stability, and adhesion properties. The disclosure utilizes a polyphenylene ether resin with hydroxyl groups at both ends to carry out dealcoholization reaction with a silane with at least one alkoxy group and at least one vinyl group at the end, so as to obtain a silane-modified polyphenylene ether resin with a vinyl group at the end. The by-products produced in the reaction process are alcohols, which may be removed by evaporation through a heating process, and there is no risk of corrosion of the PCB.

In addition, the silane used in the disclosure is an alkyl vinyl silane with two alkoxy groups at the end, not a tri-alkoxy silane which tends to self-condensate into silicone resin. After the alkyl vinyl silane with two alkoxy groups at the end used in the disclosure undergoes dealcoholization condensation reaction with the hydroxyl groups at the end of the polyphenylene ether, a linear silane-polyphenylene ether structure is formed easily. However, when a tri-alkoxy silane is used to carry out dealcoholization condensation reaction with the hydroxyl groups at the end of the polyphenylene ether, even if a small number of alkoxy groups are successfully connected to the hydroxyl groups at the end of the polyphenylene ether, it is unavoidable that the remaining alkoxy groups will further generate condensation to form three-dimensionally crosslinked siloxane (silicone oil), which increases the molecular weight and viscosity and impair the handling and compatibility. The silane used in the disclosure has at least one vinyl group, and may generate crosslinking reaction by peroxide effect to further increase the crosslink density and form a cured resin with high crosslink density.

What is claimed is:

1. A preparation method of silane-modified polyphenylene ether resin, comprising utilizing a polyphenylene ether resin with hydroxyl groups at both ends to react with a silane, and under reaction with a catalyst, which obtains the silane-modified polyphenylene ether resin, a synthesis reaction formula of which is represented by reaction formula (1):

reaction formula (1)

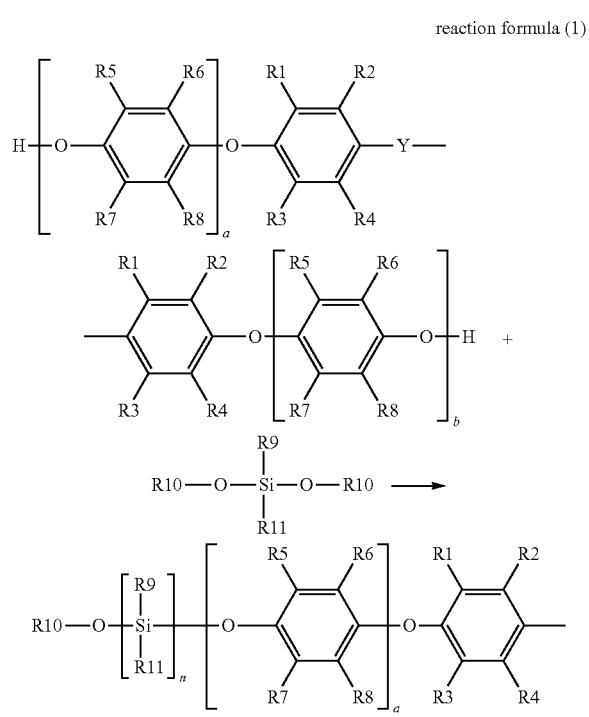

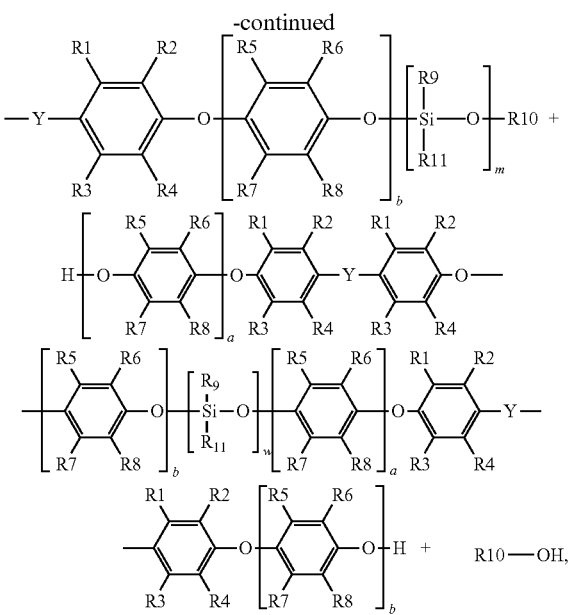

wherein in reaction formula (1), R1, R2, R3 and R4 are each independently hydrogen, a linear or branched C1 to C6 alkyl group, R5, R6, R7 and R8 are each independently hydrogen, a linear or branched C1 to C6 alkyl group, R9 is a linear or branched C1 to C6 alkyl group or aryl group, R10 is hydrogen or a C1 to C6 alkyl group, R11 is a functional group with a crosslinkable double bond, Y is a linear, branched or cyclic C1 to C10 alkyl group, W is an integer from 1 to 4, a and b are each independently an integer from 0 to 50, and n and m are each independently an integer from 1 to 4, wherein the catalyst is ethyl triphenyl phosphine chloride (ETPPCl), ethyltriphenylphosphonium bromide (ETPPBr), ethyl triphenyl phosphine iodide (ETPPI), ethyl triphenyl phosphine acetate (ETPPAAc), tetrabutylammonium bromide (TBAB), triphenyl phosphine (TPP) or tetra-n-butyl ammonium acetate (TBAAc).

2. The preparation method of silane-modified polyphenylene ether resin according to claim 1, wherein the functional group with the crosslinkable double bond comprises an allyl group, a vinyl group, an acrylate group or a methacrylate group.

3. The preparation method of silane-modified polyphenylene ether resin according to claim 1, wherein the functional group with the crosslinkable double bond comprises a C1 to C4 alkylacrylate group, a C1 to C4 alkyl vinyl group or a C1 to C3 methacryloxyalkyl group.

4. The preparation method of silane-modified polyphenylene ether resin according to claim 1, wherein a reaction temperature of reaction formula (1) is 100° C. to 160° C., and a reaction time is 6 hours to 20 hours.

* * * * *